A. C. STEWART.
AUXILIARY AIR VALVE FOR CARBURETERS.
APPLICATION FILED OCT. 3, 1911.
1,035,651.
Patented Aug. 13, 1912.
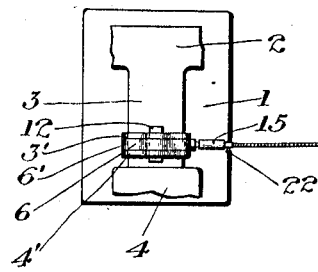
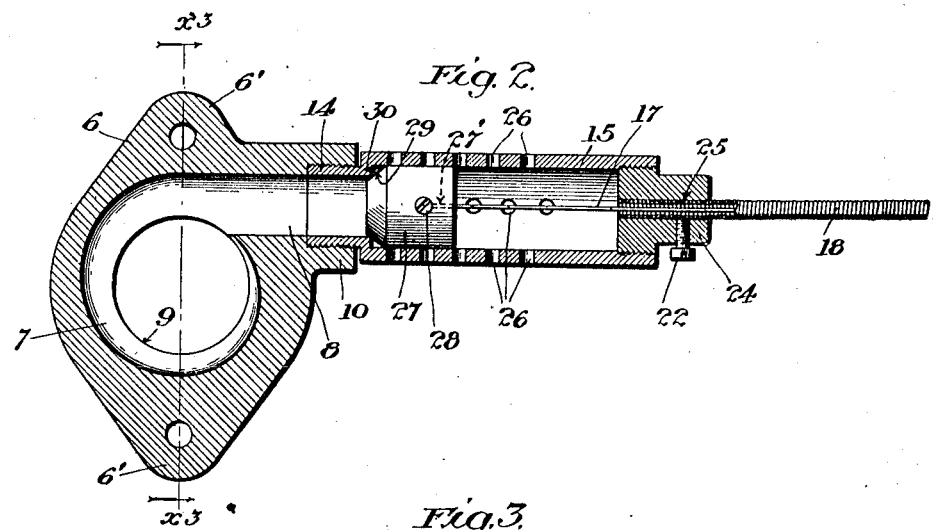
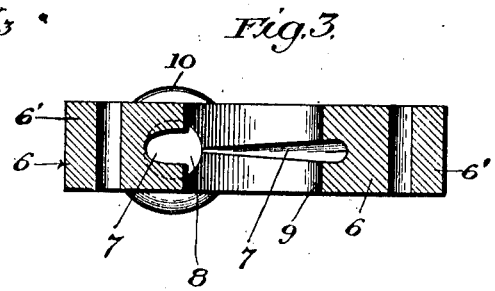
Witnesses:
Inventor:
Alfred C. Stewart,

UNITED STATES PATENT OFFICE.

ALFRED C. STEWART, OF LOS ANGELES, CALIFORNIA.

AUXILIARY AIR-VALVE FOR CARBURETERS.

1,035,651.  Specification of Letters Patent.  Patented Aug. 13, 1912.

Application filed October 3, 1911. Serial No. 652,637.

*To all whom it may concern:*

Be it known that I, ALFRED C. STEWART, a citizen of the United States, residing at Los Angeles, in the county of Los Angeles and State of California, have invented a new and useful Auxiliary Air-Valve for Carbureters, of which the following is a specification.

The object of the present invention is to provide an auxiliary air valve which may be applied between the inlet pipe of the carbureter with the minimum displacement of such parts.

Other objects of the invention appear hereinafter.

The accompanying drawings illustrate an embodiment of the invention and referring thereto: Figure 1 is a side elevation of a portion of an engine, manifold and carbureter therefor, with the auxiliary air valve and its controlling means. Fig. 2 is a horizontal section of the auxiliary air valve and its connecting device. Fig. 3 is a section on line $x^3$—$x^3$ in Fig. 2.

1 designates a portion of an internal combustion engine, and 2 the manifold for said engine having an inlet pipe 3. The auxiliary air valve is connected between the said inlet pipe 3 and the carbureter 4, the connecting means for said valve comprising a plate 6, having extensions 6' to extend between the corresponding extensions 3' and 4' on the inlet pipe and carbureter, said extensions 6', 3' and 4' being perforated to receive the fastening bolts 12, whereby the several parts are clamped together. The plate 6 is formed with a central opening 9 for establishing communication between the carbureter outlet and the inlet pipe 3, and a channel 7 is provided in said plate extending around or partly around said opening, and communicating with a lateral inlet passage 8 which extends out through one side of the plate in a lateral extension 10, and communcates with the auxiliary air valve. The passage 8 preferably extends tangentially to the opening 9 and the channel 7 tapers or diminishes in width so that the auxiliary air coming from the passage 8 is gradually forced into the opening 9 and at the same time is given a whirling motion. The channel 7 is preferably flat or elongated radially so as to provide the requisite capacity for auxiliary air, while reducing to a minimum the required thickness of the plate 6 and the passage 7 communicating with said channel may be of corresponding shape at its inner end and curving to a rounded shape at the outer end so as to conform to the circular shape of the outlet of the auxiliary air valve. The lateral extension 10 of the plate 6 is therefore of greater thickness than the body of the plate so as to provide for this rounding out of the passage, but as said extension is outside of the flanges of the carbureter and inlet pipe it does not increase the required distance between the carbureter and inlet pipe. By providing a flat plate with a flattened channel for the auxiliary air in this manner, I am enabled to introduce the requisite amount of auxiliary air without displacing the carbureter to any material extent.

The auxiliary air valve consists of a casing 15, having a reduced end portion 14 screwing into the outer end of the passage 8 aforesaid. In said casing, is mounted a slidable valve member hereinafter described, connected to and operated by the inner or movable wire 17 of Bowden wire whose outer flexible, tubular casing 18 is secured at one end to the casing 15 and at the other end to a support 19 located in any suitable position, and carrying a handle 20 pivotally mounted on said wire support 19 and connected to the inner wire 17 of the Bowden wire. Said Bowden wire casing 18 may be clamped to the support 19 and casing 15 by set screws 21 and 22.

The casing 15 for the auxiliary air valve is cylindrical and closed at its outer end by plug 24 screwed into said outer end, said plug being axially perforated as at 25 to receive the casing 18 of the Bowden wire and the fastening screw 22 being screwed into said plug to grip said casing of the Bowden wire. The Bowden wire above referred to is that disclosed in the Patent No. 609,570, August 25, 1898. The cylindrical casing 15 is provided with a series of air inlet openings 26 in its side walls distributed along the walls so as to be opened in succession by operation of the valve. The valve body 27 is mounted to slide in the cylindrical casing 15 and is connected to the inner wire 17 of the Bowden wire, said wire being inserted into a bore 27' in said body 27 and fastened by set screw 28, said body is formed with a conical valve face 29 on its outer end coöperating with an annular shoulder 30 formed in the casing 15, said shoulder forming a seat for the valve. The ports or openings 26 are distributed through the range of motion of the valve body and the combining area of these ports may be about the same as that of the reduced portion 14 of the valve casing.

When no auxiliary air is required in the operation of the engine the valve body 27 is operated by the inner member of the Bowden wire, so as to bring the conical face 29 against shoulder 30 effecting a complete shut off of the auxiliary air. When auxiliary air is required, the valve body 27 is operated by the controlling handle 20 acting through the Bowden wire, to move the valve body away from the said shoulder and longitudinally in the casing 15 to open more or less of the ports or openings 26 in the said casing; the amount of auxiliary air admitted being dependent on the extent of movement of the valve body.

What I claim is:

1. The combination with the inlet pipe for an engine, and a carbureter, of a flat plate interposed between said inlet pipe and carbureter, and having an opening establishing communication between said inlet pipe and carbureter, said flat plate having a channel extending around said opening and provided with a lateral inlet passage opening tangentially into said channel, and an auxiliary air valve connected with said lateral inlet passage.

2. The combination with the inlet pipe for an engine, and a carbureter, of a flat plate interposed between said inlet pipe and carbureter, and having an opening establishing communication between said inlet pipe and carbureter, said flat plate having a channel extending around said opening and provided with a lateral inlet passage opening tangentially into said channel, and an auxiliary air valve connected with said lateral inlet passage, said channel being of less height than the opening of said lateral inlet passage and tapering in width for the purpose set forth.

In testimony whereof, I have hereunto set my hand at Los Angeles, California, this 26th day of September, 1911.

ALFRED C. STEWART.

In presence of—
ARTHUR P. KNIGHT,
GLADYS RUSSELL.